March 14, 1939.  C. E. HOOVER, JR  2,150,603
APPARATUS OF MULLING PIGMENT
Filed Dec. 3, 1937  3 Sheets-Sheet 3
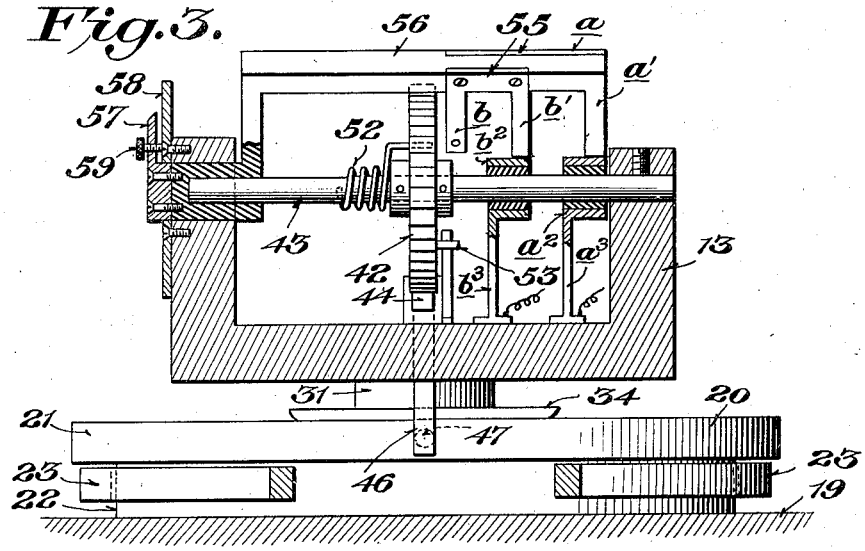
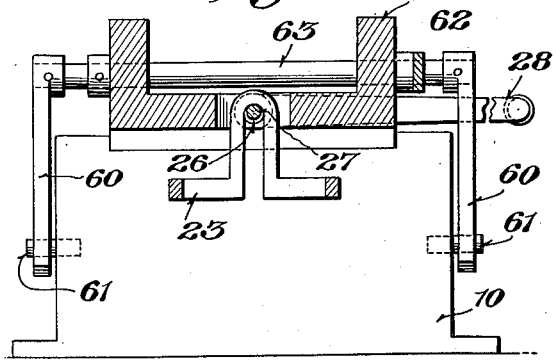
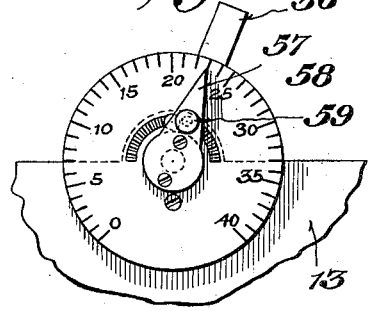
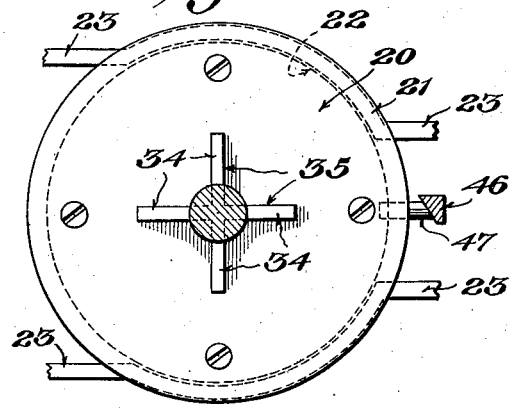
Inventor
Charles E. Hoover, Jr.
By 
Attorney Patented Mar. 14, 1939

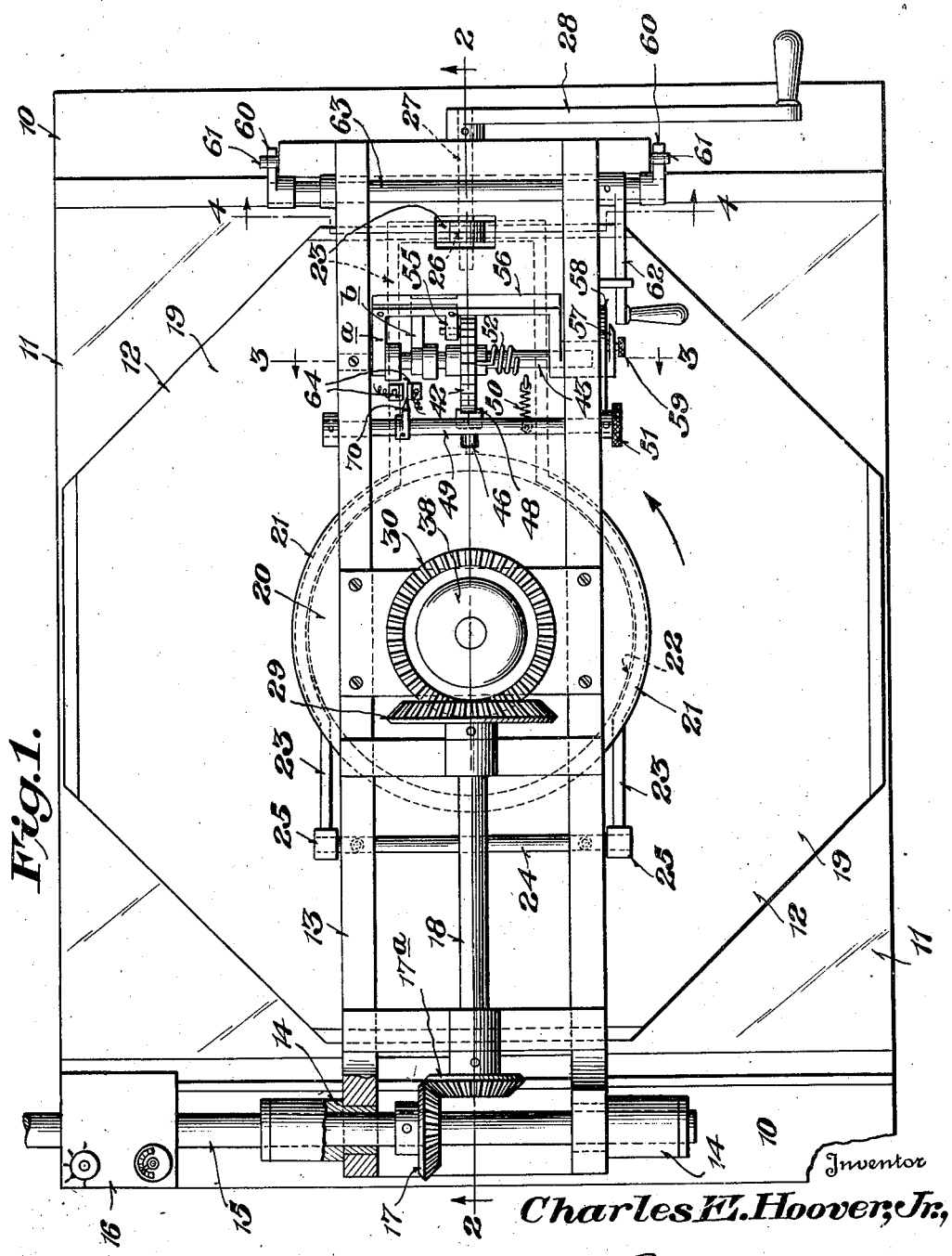

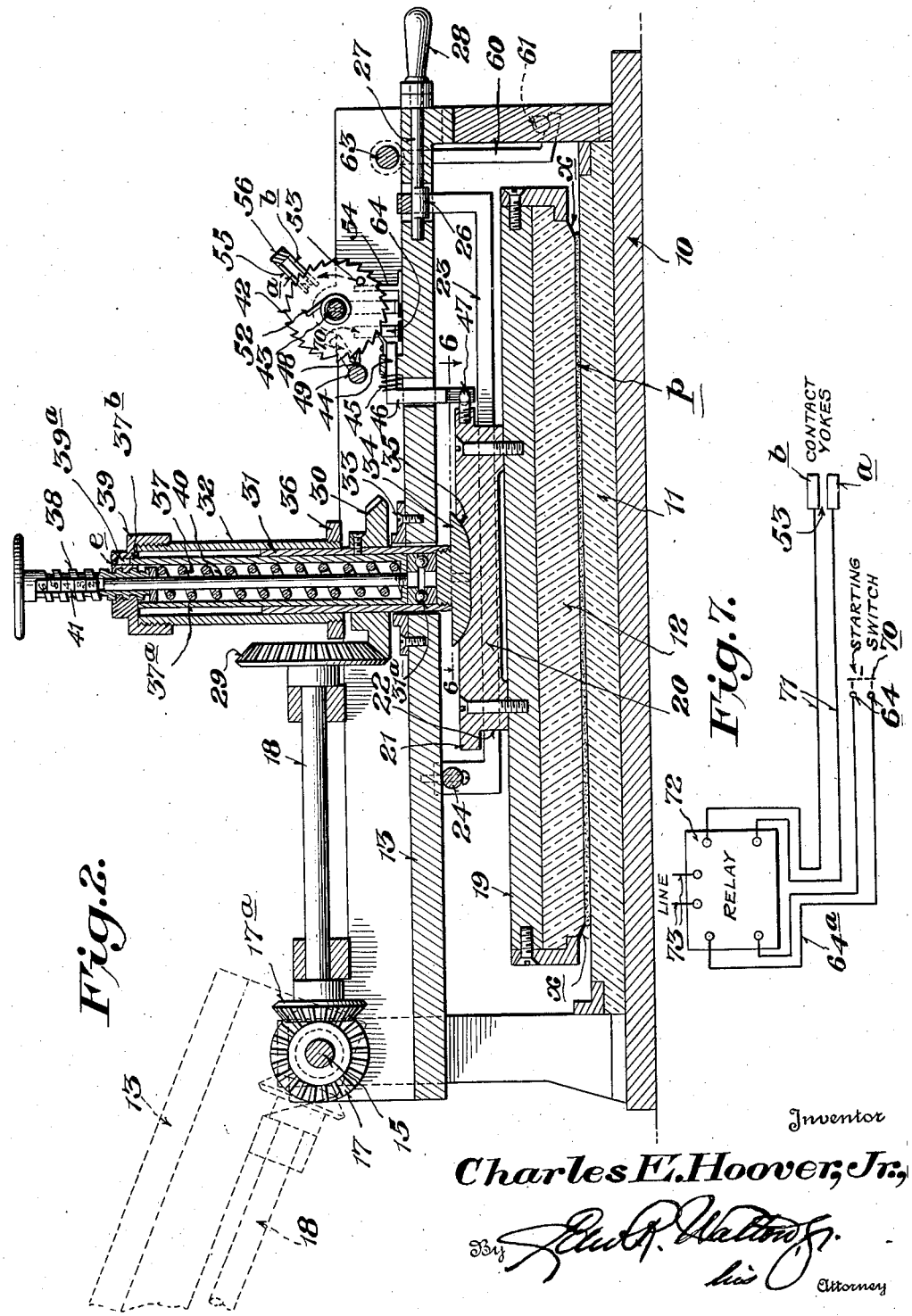

2,150,603

UNITED STATES PATENT OFFICE 2,150,603

APPARATUS OF MULLING PIGMENT

Charles E. Hoover, Jr., Maplewood, N. J.

Application December 3, 1937, Serial No. 178,009

9 Claims. (Cl. 73—51)

The present invention relates to the art of testing and matching of colors.

In the art of testing or matching colors which are supplied to the dye industry, paint industry and others, which use the same in making up dyes or paints and the like with other materials or ingredients, it is difficult to match the color of a previous batch of paint or dye or the color of an article from swatches or samples because there are many factors which have affected the color in its mixing and composition with other ingredients and which have to be taken into consideration by the colorist or purveyor of color, such as conditions under which approximately the same color is produced by different manufacturers, the locality from which they are secured, the time element which colors (either dry or wet) are allowed to stand, the conditions under which the color is used by the dyer, the paint manufacturer or other ultimate user, and in the paint industry, particularly, the type of mill employed in mixing or compounding the paint which produces different pressures and speeds and, consequently, varying the temperature and rubbing of the color ingredient and thus affect its shade of the color.

In the testing or matching of colors, the practice has become universal whereby the testing laboratory or purveyor of color for the various industries matches a given color by placing a quantity of selected pigment of fine particle size on a slab with a spatula (usually with definite quantity of oil or other suitable liquid) and manually rubs the pigment and oil with a hand muller or other suitable implement. The amount of pressure applied to the implement and the number of strokes given thereto are for the purpose of approximating as closely as possible the conditions the color swatch to be matched have undergone so that the proper pigment may be selected from stock for its ultimate compounding either with a dye, paint or the like. This manual testing is rather empirical as it is difficult, if not impossible, to simulate the pressure and conditions under which the pigment in the swatch to be matched has been subject; and, furthermore, it is difficult for the same operator to repeat the same test with the same pressure and rate of movement of the hand muller or rubbing implement, and it is impossible for two different operators to simulate the same rubbing or testing because of the personal element or difference between the pressure and speed or rubbing which may be exerted by the two operators, although each endeavor to simulate the other. Consequently, the present method of selecting pigment to ultimately produce a given shade of color for the industry is laborious, tedious, uncertain and expensive in both labor and material as many attempts have to be made with the result that in most cases only approximations are obtained.

While endeavor has been made to provide a more accurate method and means for performing pigment testing, efforts in this regard have been impractical and unsatisfactory and there is no device now known or available for accomplishing the results desired—and all testing now done, aside from that performed by the present invention, is accomplished manually substantially in the manner above stated.

The present invention has for its object the provision of a machine for mulling pigment of fine particle size. The essential principle involved is the maintenance of a constant select speed mulling movement; a constant preselected pressure under which the mulling movements are performed, and a determined number or amount of mulling movements for each test of pigment, preferably with a measured amount of oil or other suitable liquid; while the machine may be adjusted so as to subject the pigment to the selected pressures which will be identical to, or more closely approximate, the pressure the pigment is subjected in mills when compounded with other ingredients; and may be also adjustable to subject the pigment to a selected number of rubbing movements and to constant predetermined speed or rate of movement so that the same testing operation can be duplicated or repeated, even at remote points, on like machines after the desired pressure or speed or rubbing movements, or all three, are known.

With the above and other objects in view, which will appear as the specification proceeds, the invention further resides in the sundry details of construction, combination and arrangement of parts hereinafter more fully described and pointed out in the appended claims.

In the drawings which show the preferred embodiment of the invention as at present devised:

Figure 1 is a top plan view of the mulling machine;

Figure 2 is a longitudinal section of the same taken substantially on line 2—2 of Fig. 1;

Figure 3 is a transverse sectional view taken substantially on line 3—3 of Figure 1;

Figure 4 is a transverse sectional view taken substantialy on line 4—4 of Figure 1;

Figure 5 is an enlarged fragmentary view of the dial and pointer of the stroke or revolution control device;

Figure 6 is a sectional view taken substantially on line 6—6 of Figure 2; and

Figure 7 is a diagrammatic view of the electrical control means of the machine.

In the drawings in which like characters denote similar and like parts throughout the specification and the several views, 10 denotes a base having a stationary, but removably mounted, plate or platen 11 upon which is placed the pigment to be tested. The platen 11 may be of glass, metal or other material.

A muller 12, of glass, metal or other suitable material, is disposed above the platen 11 and is suitably supported in position to normally contact therewith and to be moved relative thereto under preselected pressure and at a predetermined speed, the pigment to be tested being between the platen 11 and muller 12 and is indicated by the letter p.

In the present embodiment of the invention, the muller 12 is loosely attached to a frame or support 13 pivoted at one end so that it may be swung upwardly to expose the plate 11 and is preferably journaled at 14 on a drive shaft 15 extending transversely thereof from a source of power (not shown). The speed of the shaft 15 may be regulated by any suitable means, as is generally indicated by a variable speed device 16 of any approved type. The mulling plate 12 is preferably carried in a frame or backing plate 19, to the outer surface of which is centrally disposed a disc-like member 20 having an outwardly lateral flange 21 at its upper periphery providing a groove or guideway 22 in which extends, on opposite sides of the disc 20, the arms of a yoke or auxiliary frame 23 pivoted to the muller frame 13, such as on the ends of a bar 24 providing trunnions on which the ends 25 of the yoke are journaled. The other end of the yoke 23 is supported on an eccentric or cam 26 of a shaft 27 journaled in the frame 13 and rotatable by a suitable crank or handle 28. The groove or guideway 22 is of greater width than the thickness of the yoke 23 so as to permit a relative movement of the muller 12, and its attached parts, laterally with respect to the frame 13 and the yoke 23.

The muller 12 is rotated from the miter gear 17 on the drive shaft 15 through a miter gear 17a on the outer end of a jack shaft 18 having on its other end a miter gear 29 meshing with a miter gear 30 fast on a tubular shaft 31. The tubular shaft 31 has its upper end slidably and rotatably mounted in a sleeve 32 rigid on the frame 13 and its other end portion slidably extending through a bearing plate 33 in the frame 13, the lower extremity of the shaft 31 having a substantially convexed head portion 34 fast thereto, consisting of radiating arms adapted to extend into and engage in complemental portions or grooves 35 in the disc 20, thus providing a rockable clutch connection between the shaft 31 and the disc 20.

The sleeve 32 is rigidly connected to a cross member 36 on the frame 13 and has disposed in it a helical compression spring 37 which bears at one end against the head 34 on the shaft 31 and at its other end bears against an adjustable screw 38 threaded in a cap 39 removably secured to the upper end of the sleeve 32. Manifestly, an adjustment of the screw 38 will place sufficient or the desired pressure upon the spring 37 to maintain the shaft head 34 in driving contact with the grooves 35 of the disc 20 rigidly carried by the muller 12; and variations in this pressure can be provided to increase or diminish the pressure of the muller 12 upon the pigment p between the muller and the slab or platen 11. In practice, it has been found desirable to interpose between the spring 38 and the tubular shaft 31 a tubular guide 37a which may be closed at its bottom against which the lower end of the spring 38 may bear, there being a ball-bearing 31a disposed between the lower closed end of the guide 37a and the head 34 and the upper end of the guide is provided with a lug or projection 37b slidably extending into a slot 39a in the underside of the cap 39, whereby the guide is held against rotation, although it may reciprocate with the shaft 31 as the slot 39a is deep enough to allow necessary movement due to the raising and lowering of the muller 12 under the action of the spring 37.

In order to indicate the degree of pressure desired or to be maintained upon the muller 12, an indicator may be provided of any desired type. This indicator may take the form of a rod 40 having its lower end threaded in the closed bottom of the tubular guide 37a and having its other end extending through a bore in the screw 38 to a point above the edge e of cap 29, one side of the screw 38 being slotted through which the rod is visible and which is provided with a suitable scale 41 with which the upper end of the rod 40 will cooperate to indicate the pressure. By adjustment of the screw 38 to bring the working scale 41 to register with the upper end of rod 40, the pressure desired on the muller 12 during operation may be obtained. As the platen 11 or muller 12 wear, thus lowering the upper end of rod 40 with respect to its desired adjusted position on the scale 41, this wear may be compensated for by merely adjusting screw 38 to bring the upper end of rod 40 in register with the desired position on scale 41. Consequently, it is obvious that the dimensions and calibrations of the spring 38 should be adequately and properly chosen.

The amount of loose lateral movement the disc 20 may have on the yoke 23 should not be sufficient to cause disengagement of the gears 29 and 30 and the depth of the teeth between these gears should be sufficient for this purpose, yet this slight movement is sufficient so that—when the muller 20 is in operative position with the pigment between it and the platen 11—full exertion of any pressure from the spring 37 will be permitted on the muller 12.

From the above it will be seen that the muller 12 is rotated from the drive shaft 15, jack shaft 18 through gears 29 and 30, to drive shaft 31, head 34 and disc 20. The amount of mulling or rubbing operations, and in the present embodiment these are represented by rotation of the muller 12, can be regulated and controlled by a control device for stopping the motor or prime mover or a clutch mechanism (not shown). In the present embodiment, this control device consists of a ratchet wheel 42 loosely mounted on the supporting shaft 43 having its ends fixedly secured in the side members of the frame 13. A ratchet feed dog 44 is slidably mounted on the frame 13 and positioned adjacent the wheel 42 to engage the teeth of the same in order to advance the wheel the distance of one tooth in one direction of rotation of the wheel. This feed-dog is normally held retracted from engagement with the ratchet wheel 42 by a spring 45 and is further provided with an arm or other suitable portion 46 arranged in the path of movement of a striker-dog 47 projecting from the disc 20 whereby, upon each revolution of the disc 20 (and, therefore, of the muller 12), the dog 47 will be brought into engagement with the projection 46 and move the feed-dog 44 into engagement with the ratchet to advance the same. A holding dog 48 is carried on a rotatable shaft 49 whose movement is biased by a spring 50 to normally hold the dog 48 in engagement with the ratchet wheel to prevent movement of the latter in a direction counter to the movement imparted to it by the dog 44. When the shaft 49 is rotated by a handle or knob 51 in opposition to the tension of the spring 50, the feed-dog 48 is moved out of engagement with the wheel 42 whereupon the wheel 42 is returned to its starting or zero position by torsion spring 52 preferably surrounding the shaft 43 and having one end secured to the latter and the other end secured to the wheel 42, the wheel 42 being stopped in its zero position by a suitable projection 53 thereon engaging with a stop 54 on the frame 13.

It is obvious, therefore, that each tooth on the gear 42 represents one muller stroke or revolution of the muller 12. In order to control the revolutions of the muller, an adjustable switch 55 is provided which is actuated by the projection 53 on the wheel 42. This switch is preferably mounted to be adjustable about the axis of the wheel 42 with respect to its zero position; and this mounting may take the form of a U-shaped frame 56 of fibre material having its free ends rotatably mounted on the shaft 43, one of said free ends having an extension at its journaled portion extending through the frame 13 and provided with an indicator pointer or hand 57 adapted to cooperate with a suitable scale 58 on the outer face of the frame. A suitable detent 59 is provided on the pointer to cooperate with interengageable portions on the scale 58 in order to lock or hold the frame 56 in adjusted position. The switch 55 may take the form of two spring arms $a$ and $b$, normally out of contact, positioned to be engaged by the projection 53 whereby one the arms may be pressed into engagement with the other to establish a control circuit to a relay 60 which in turn controls the operation of the shaft 15 from the power source, in any approved manner. The contact arms $a$ and $b$ have extensions $a'$ and $b'$ which have a wiping contact with electrical conducting bushings $a^2$ and $b^2$ supported on and insulated from the shaft 43, these bushings $a^2$ and $b^2$ having extensions $a^3$ and $b^3$ secured to the frame 13.

The operation of the device is as follows: If it is desired to test a certain pigment for color or shade which it will develop in a given ultimate product, a very small quantity (a fraction of a gram) of a pigment or combination of pigments (with a desired or required quantity of oil or other liquid mixed with it) is placed upon the platen 11 by a spatula. The frame 13 is then moved downwardly from its dotted line position (shown in Fig. 2) to its full line position (shown in Figs. 1, 2 and 3) where it may be locked in position by any suitable locking or latch means, such as hook-like fingers 60, which may be carried on the distal end of the frame 13 and swung under lugs 61 on the base 10 by means of a crank 62 on the shaft 63 to which the fingers 60 are connected.

With knowledge of the conditions under which the pigment is to be used in mind, the operator adjusts the variable speed device 16 to that desired for rotating the muller 12; adjusts the screw 38 to provide the proper tension on the spring 37 for producing a desired constant pressure on the muller 12; and adjusts the index pointer 57 relative to the scale 58 for the number of revolutions of the muller desired or required, the index pointer being locked in position by the detent 59.

Suitable means are then operated, for instance a push-button starter switch to close the circuit to the power source (not shown) whereby the shaft 15 is actuated and through the means previously described, a muller 12 is rotated. It is at present preferred, however, that the starting of the machine be accomplished by a movable contactor or switch arm 70 mounted fast on the shaft 49 and at least a 45° angle with respect to the dog 48, so that when the shaft 49 is rotated in a clockwise direction the dog 48 will first be moved out of engagement with the ratchet 42 thereby allowing the spring 52 to return the ratchet 42 to zero position and, then, continued clockwise rotation of the shaft 49 will move the switch arm 70 into engagement with the contacts 64 of the starting circuit 64a. When the knob 51 has been released by the hand of the operator, the spring 50 will then rotate the shaft in an anti-clockwise direction, first moving the switch arm 70 (which in the meantime has established a holding circuit in the line 73 to keep the machine operating) out of engagement with contacts 64 and then returning the dog 48 to its normal position for cooperation with the ratchet 42.

Upon each revolution of the muller, the striker-dog 47 will operate the ratchet dog 44 to move the ratchet wheel one tooth, the dogs 48 preventing a reverse rotation of the ratchet wheel. As the projection 53 on the ratchet wheel reaches the adjusted position of the switch 55, it will contact the same and close the contacts thereof, establishing the circuit 71 to a relay 72 which breaks the holding circuit 73 to the power source clutch (not shown) whereby the muller is brought to rest.

Should, for any reason, there be any unevenness of the pigment between the muller 12 and platen 11, the muller may adjust itself by shifting under the convexed head 34 of the shaft 31, thus allowing equal pressure from the spring 37 to be exerted on all faces of the plate. It has been found in practice that the pigment will not spread itself beyond the chamfered edges $x$ of the muller 12.

After the mulling operation the muller 12 may be removed from the platen 11 to expose the mulled pigment, by first operating the crank 28 whereby the cam 26 will raise the yoke 23 into engagement with the finge 21 on the disc 20 and continued upward movement of the yoke 23 will break the adhering contact between the muller and the platen. The lock fingers 60 are then swung out of engagement with the lug 61 and the frame 13 may be rotated about the shaft 15 to dotted line position.

Should it be necessary to repeat the test for any one color or shade, under different conditions, the same operation may be repeated but by varying either the speed, the pressure, the number of revolutions or mulling movements, or all three until the proper shade is acquired. Then, with a record being made of these results, the same operations may be duplicated again with assurance that the same pressure, speed and number of mulling movements without variation (as is now not possible under the present practices) in the same plant or at remote points.

The advantages of the present invention are positive and economical in that—

1. The presure under which the pigment is operated may be varied and held constant to suit the requirements of the operator and may be duplicated by another;

2. A positive control over a number of mulling movements is possible which may be also duplicated and repeated by anyone;

3. A constant speed of surface contact during the mulling movements upon the pigment is obtained;

4. Variation of any one or all of the conditions of mulling will enable the operator to approximate production, plant grinds and of eliminating the necessity of large quantities of materials to be used in the tests as only a fraction of a gram need be employed, thus saving time and material;

5. Experimental work may be readily accomplished because comparisons may be made more quickly, accurately and duplicated.

Having thus described one embodiment of the invention and the manner in which it is to be performed, it is to be understood that the invention is not limited to the exact steps and construction herein described as it may be varied and modified in numerous ways which fall within the terms of the appended claims.

That which is claimed is:

1. A laboratory mulling device for testing or matching samples of pigment for color or shades of color, comprising two mulling members having opposed flat and smooth mulling surfaces, each surface being continuous and unbroken within its perimeter, means mounting said members for relative movement to and from each other for moving them into cooperative relation and for separating said members to completely expose the mulling surfaces of said members to permit access to said surfaces for the purpose of placing thereon and the removal therefrom of said sample, means mounting said members for relative mulling movement, means for producing said relative movement of said members at a constant predetermined speed, and means for applying a selectable constant pressure on said members during said relative movement of said members whereby the sample therebetween may be subjected to a desired pressure.

2. A laboratory mulling device for testing or matching samples of pigment for color or shades of color, comprising two mulling members having opposed mulling surfaces and being mounted to be moved to and from each other for separating said members to permit access to said surfaces for the purpose of placing thereon and the removal therefrom of said sample, said members being mounted to have relative mulling movement, means for producing said relative movement of said members at a constant predetermined speed, means for applying a selectable constant pressure on said members during said relative movement of said members whereby the sample therebetween may be subjected to a desired pressure, and means for stopping the relative movement of said members after a predetermined number of said movements of said members.

3. A laboratory mulling device for testing and matching pigment for color comprising two mulling members having opposing surfaces and mounted for mulling movement relative to each other, means supporting one of the members and by which said member is moved into and out of cooperative relation with the other member, the member on said supporting means having a tiltable connection with said supporting means, whereby the mulling surface of said member may be tilted with respect to the mulling surface of the other member, means for producing said mulling movement, means on said supporting means for exerting a preselectable yieldable pressure on the mulling member carried thereby, and means for moving said members relatively from each other against the action of said yielding pressure means, thereby to break the adhesion between them before said members are moved out of cooperating mulling position by said supporting means.

4. A mulling device for testing or matching pigment for color comprising two mulling members mounted for mulling movement relative to each other, supporting means for one of said members and with which said member has a yieldable connection, means for producing said mulling movement of said members, means on said support for exerting a preselected pressure on said member connected to said support, means for moving said member to and from the said support through said yieldable connection, whereby said member may be moved relatively to the other of said members to break the adhesion between them, and control means actuated by the mulling movements, said control means including an adjustable element for stopping said relative movement of said members and operated when a preselected number of mulling movements has been attained.

5. In a color mulling machine of the kind described, a frame comprising a base member having a pigment supporting surface, an overlying movable muller support, a yoke pivoted to said support, a muller rotatably mounted in said yoke and in cooperative relation with the mulling surface on said base, means connected with said muller for rotating the same, and means for moving said yoke on its pivot whereby the adhesion between said muller and said mulling surface may be broken.

6. In a color mulling machine of the kind described, a frame comprising a base member having a pigment supporting surface, an overlying movable muller support, a muller rotatably supported from said movable support and in cooperative relation with the mulling surface of the base frame, means for rotating said muller and comprising a shaft supported on said movable frame having a rockable drive connection with said muller.

7. In a color mulling machine of the kind described, a frame comprising a base member having a pigment supporting surface, an overlying movable muller support, a muller rotatably supported from said movable support and in cooperative relation with the mulling surface of the base frame, means for rotating said muller and comprising a tubular shaft slidably mounted on said movable support, and adjustable pressure means extending through said tubular shaft for exerting pressure upon said muller, the connection between said muller and said movable frame permitting slidable axial movement of the muller relative to the frame.

8. In a mulling device of the kind described comprising a base frame having a mulling surface thereon, an overlying muller-support, a drive shaft mounted on said base frame and having one end of said muller-support pivoted thereon, means for supporting the distal end of said muller-support in cooperative relation to the base frame, a muller on the under surface of said support and rotatably supported thereon, means on the support for driving said muller comprising a driven part having one end in driving engagement with the muller, a shaft between said driving shaft and said driven part, gear connections between said shafts, whereby said support including said muller may be swung about the driven shaft out of operative position.

9. A mulling device for testing or matching pigment for color or shade of color, comprising two mulling members mounted for mulling movement relative to each other, means for producing said mulling movement of said members, movable supporting means for one of said members and with which said member has a yieldable connection whereby said members may be brought into cooperative relation or separated to completely expose the mulling surfaces, means on said support for exerting a preselectable pressure on said member connected to said support, means for moving said members relatively from each other to initially break the adhesion between said surfaces before said supporting means is operated to move said members out of cooperative relation, and control means actuated by said mulling movements for stopping the same when a predetermined number of mulling movements have been attained.

CHARLES E. HOOVER, Jr.